G. H. Reister,
Wind Wheel,

Nº 31,141. Patented Jan. 15, 1861.

Witnesses:
J. Brainerd
G. C. Lambright

Inventor:
Reister atty Thos. T. Everett

UNITED STATES PATENT OFFICE.

GEORGE H. REISTER, OF WASHINGTON, IOWA, ASSIGNOR TO HIMSELF, E. CADWALADER, AND L. S. BUTTERFIELD, OF SAME PLACE.

IMPROVEMENT IN WINDMILLS.

Specification forming part of Letters Patent No. 31,141, dated January 15, 1861.

*To all whom it may concern:*

Be it known that I, GEORGE H. REISTER, of Washington, in the county of Washington and State of Iowa, have invented a certain new and useful Improvement in Wind-Wheels; and I do hereby declare the following to be a full, clear, and exact description of the construction and operation thereof, reference being had to the accompanying drawings, and to the letters and marks thereon.

My invention relates to that class of wind-wheels which are used for propelling machinery wherein direction is given to the wind by guides, the wings against which the wind strikes being fixed to a cylinder attached to the rotating or power shaft; and my invention consists in an arrangement of a series of rigid guides and a series of movable guides by which the wind is always so directed, no matter what may be its natural track or line, as to strike the wings of the wheel at or nearly at right angles to their faces, the amount or volume of wind passing onto the wings being also controlled.

Figure 2:
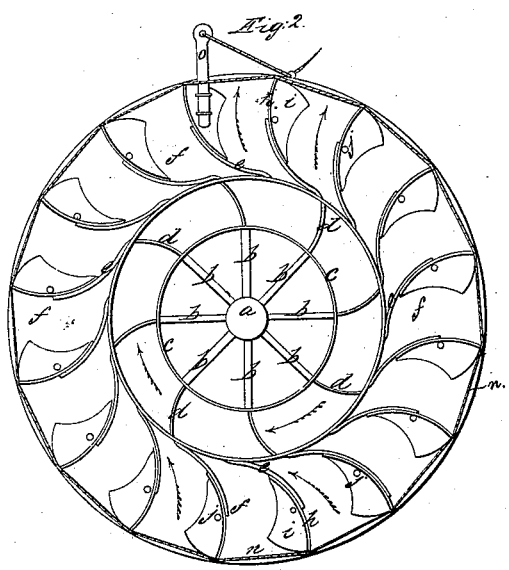
Figure 3:
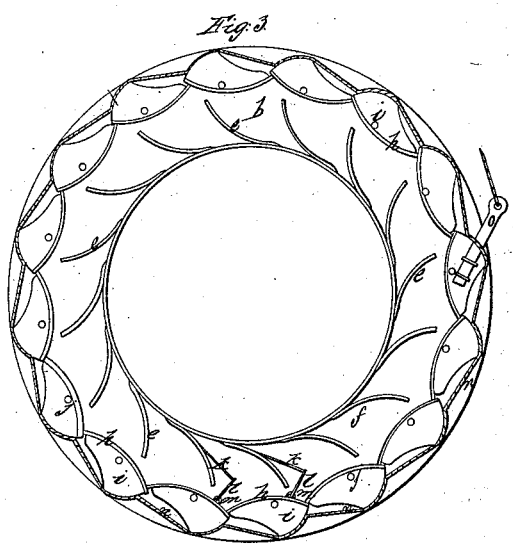
Figure 1:
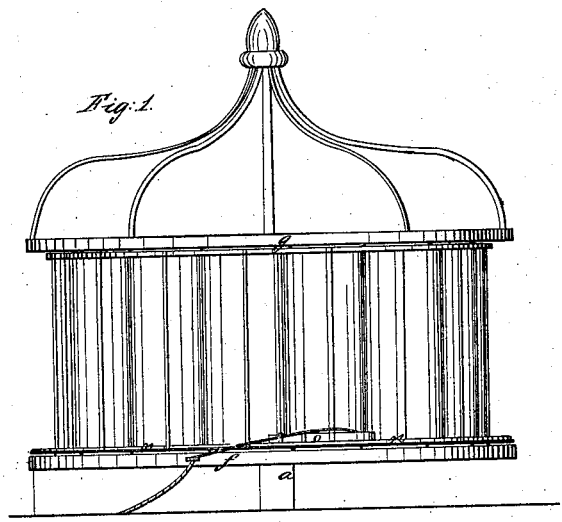

A wind-wheel of the character here named and having my improvement thereon is shown by the drawings forming part of this specification, Figure 1 being a view in perspective of the whole structure; Fig. 2, a view by horizontal section, the movable guides being fully open; and Fig. 3 a top view of the interior as seen after the removal of the cap or dome, the movable guides being closed and the wheel at rest.

In each of these figures where like parts are shown like letters and marks are used in referring to them.

The main or power shaft is marked $a$, its radial arms $b$, its shell, which is the cylinder of the wheel, $c$, and the wings rigidly attached to the cylinder, $d$.

To the lower end of the power-shaft can be affixed any of the usual mechanical means for transmitting motion to the machinery to be propelled.

The stationary guides are marked $e$, and at their ends are affixed to the base-plate $f$ and to the top plate $g$ by any suitable means. It will be noticed that they are of curved form the better to direct the wind to the wings. The movable guides $h$ are also of curved form, and are attached at their ends to eccentric-shaped blocks or plates $i$, and turn on pins $j$, which pass through holes in the blocks into the base and top plates. Springs $k$, connected to the surface of the fixed guides at their inner ends and to the movable guides by a rod $l$ and eye $m$ at their outer ends, operate to close the movable guides and shut out the wind, while chains or cords $n$ are attached to each eccentric block throughout the whole of the series and by a lever $o$ are made to move the guides so as to open fully or to any such degree as it may be desirable to adapt the movement of the wheel to the work to be performed and to the force or power of the wind. The lever $o$ may be moved by hand or by the governor, as may be preferred. It will readily be perceived that when the movable guides are opened, as represented by Fig. 2, the wind will pass in the direction of the arrows onto the wings without its force being in any degree broken or interrupted, and that the full power of the wind will be obtained toward the rotation of the wheel, and that the volume of the wind passing inward may easily and perfectly be controlled without changing the line of its direction materially. This arrangement, therefore, of the curved fixed and curved movable guides will overcome many of the objections heretofore found to exist in this class of wind-wheels when guides have been used.

What I claim as my invention, and desire to secure by Letters Patent, is—

The series of the movable curved guides and fixed curved guides as they are arranged and operated in relation to each other and to the wheel, as herein set forth.

This specification signed this 22d day of October, 1860.

GEORGE H. REISTER.

Witnesses:
J. F. MCJUNKIN,
L. S. BUTTERFIELD.